United States Patent [19]

Willem

[11] 4,263,478
[45] Apr. 21, 1981

[54] INSULATOR EQUIPPED WITH A DEVICE FOR FIXING A BARE CABLE THERETO

[75] Inventor: Michel Willem, Vichy, France

[73] Assignee: Societe Anonyme dite: Ceraver, Paris, France

[21] Appl. No.: 36,018

[22] Filed: May 4, 1979

[30] Foreign Application Priority Data

May 18, 1978 [FR] France ................................ 78 14720

[51] Int. Cl.³ .......................................... H01B 17/22
[52] U.S. Cl. .................................. 174/169; 24/132 R
[58] Field of Search ............... 174/40 R, 42, 168, 169, 174/172; 339/265 R; 24/81 KK, 115 R, 132 R, 132 WL, 135 R, 135 A, 135 K, 135 L, 135 N; 248/58, 63, 64, 74 R; 403/206

[56] References Cited

U.S. PATENT DOCUMENTS

| 2,311,486 | 2/1943 | Swearingen | 174/172 |
| 3,115,688 | 12/1963 | Smith | 403/206 |

FOREIGN PATENT DOCUMENTS

| 680077 | 8/1939 | Fed. Rep. of Germany | 174/42 |
| 2745045 | 4/1978 | Fed. Rep. of Germany | 174/172 |
| 659322 | 2/1929 | France | 248/63 |
| 782902 | 3/1935 | France | 248/63 |
| 1143442 | 4/1957 | France | 174/40 R |

Primary Examiner—Laramie E. Askin
Attorney, Agent, or Firm—Haseltine and Lake

[57] ABSTRACT

The invention relates to fixing a bare cable on an electric insulator by means of a device which includes a fixed part integral with the insulator and which has a groove (5) which forms a cradle in which the cable is laid, as well as a moving part (8) which holds the cable in its cradle in the locked position. According to the invention the fixed part and the moving part have contact surfaces with the cable to be fixed such that said cable in the locked position is subjected to progressive deformation of its cross-section in a first direction substantially perpendicular to the direction which corresponds to the clamping of the moving part at the central portion of the cradle and in a second direction substantially perpendicular to the first direction at the two ends of the cradle. Application in particular to support insulators and to suspension insulators.

11 Claims, 8 Drawing Figures

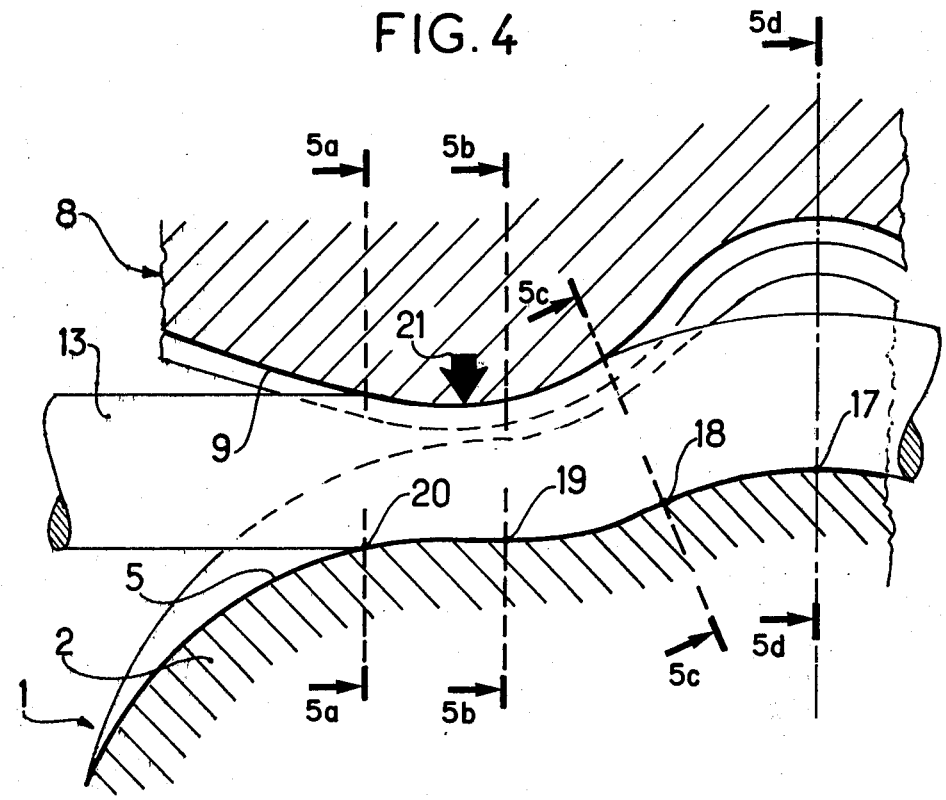
FIG. 4
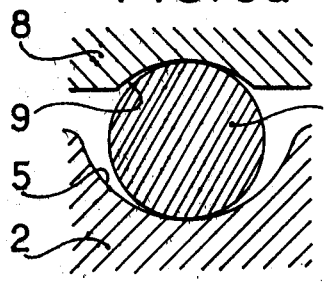
FIG. 5a
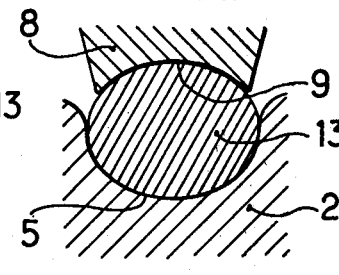
FIG. 5b
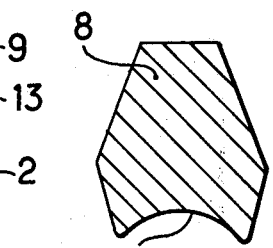
FIG. 5d
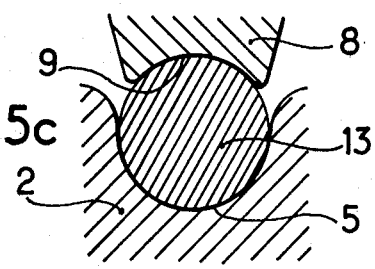
FIG. 5c
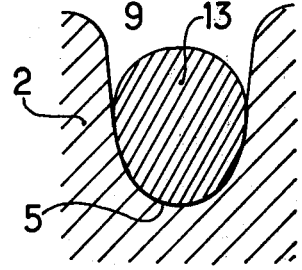

INSULATOR EQUIPPED WITH A DEVICE FOR FIXING A BARE CABLE THERETO

The present invention relates to mechanically fixing a bare cable on an insulator and more particularly to a fixing device designed for equipping support insulators and suspension insulators.

There are already numerous kinds of devices which allow a bare cable to be fixed on an insulator. These kinds of devices are generally constituted by a fixed part integral with the insulator and a moving part connected to the fixed part, said fixed part having a groove which forms a cradle to accommodate the cable to be fixed, and said moving part having a locked position in which it holds the cable in the cradle.

There is a need, in operation, for a fixing device to hold a cable firmly up to some threshold differential tension (i.e; the difference between the tensions in the cable on different sides of the fixing device). Above this threshold tension it is preferable for the fixing device to allow the cable to slide longitudinally through it. For example, if frost falls off the cable on one side but not the other of the fixing device, the differential tension is usually best resisted until the frost falls off the other side also. In contrast, if a pylon is knocked down, it is preferable for the cable to slide through the fastening devices of the neighboring pylons to avoid damaging (bending or twisting) the insulator supports on the neighboring pylons.

A drawback with many prior art fixing devices is that their sliding threshold tension varies as a function of the total tension on both sides of the fixing device. Additionally, means are often provided for setting or adjusting the threshold tension which has the disadvantage of allowing human error a chance to operate as well.

The optimum threshold tension can be determined a priori as a function of the mechanical strength of the conductors and/or of the pylons. Preferred embodiments of the present invention provide a fixing device in which the threshold sliding tension is determined by the shape and sizes of the device relative to the cable it is to hold in a manner which is substantially independent of the tensions in the cable when the fixing device is fastened. Indeed, in some applications, it is possible with suitable embodiments of the present invention to release and then refasten the fastening device while engaged with a live cable in order to allow a cable to return substantially unhindered to its normal position after some abnormal event has caused the cable to slide and the cause of sliding has then been removed.

The present invention provides a device for fixing a bare cable on an insulator, said device including a fixed part integral with the insulator and a moving part connected to the fixed part, said fixed part having a groove which forms a cradle in which the cable to be fixed is laid and said moving part holding the cable in the locked position in its cradle, characterized in that the fixed part and the moving part have contact surfaces with the cable to be fixed such that said cable in the locked position is subjected to progressive deformation of its cross-section in a first direction substantially perpendicular to the direction which corresponds to the clamping of the moving part at the central portion of the cradle and in a second direction substantially perpendicular to the first direction at the two ends of the cradle.

The device according to the invention may also have at least one of the following characteristics:

the fixed part has a cradle whose cross-section changes progressively along the bottom line of said cradle from a cross-section which is substantially elliptically shaped with a large axis perpendicular to the clamping direction of the moving part at each input of the cradle to a cross-section which is semi-elliptically shaped with a large axis parallel to said clamping direction at the central portion of said cradle;

at each input, the cradle has a cross-section which changes progressively from the semi-elliptical shape to a substantially semi-circular shape for a portion of the cable which is not yet subjected to the direct contact of the moving part;

the bottom line of the cradle forms a curve at the central portion of said cradle;

the radius of curvature at the bottom of the cradle, in the central portion of said cradle, is smaller than the smallest radius of the bare cable which can be accommodated by said device, said radius of curvature also being sufficiently large for the rate of deformation of the largest bare cable which can be accommodated not to exceed 12%;

the moving part has only two portions of contact with the cable to be fixed, said portions being substantially situated at the two inputs of the cradle;

the moving part is connected to the fixed part by an articulation component which allows the moving part to be applied on the cable by the resilient traction forces;

the fixed part is a one-piece hood fixed to the head of the insulator, said hood having a groove which forms a cradle, the moving part being a shoe articulated on the hood by a resilient arm which locks the moving assembly; said groove is advantageously provided at the top portion of the hood so that the cable to be fixed is above said hood and in the vicinity of the axis of the head of the insulator; and the device may form a plane of symmetry substantially perpendicular to the direction of the cable and containing the axis of the head of the insulator.

An embodiment of the invention is described by way of example, with reference to the accompanying drawings, in which.

Figure 3:
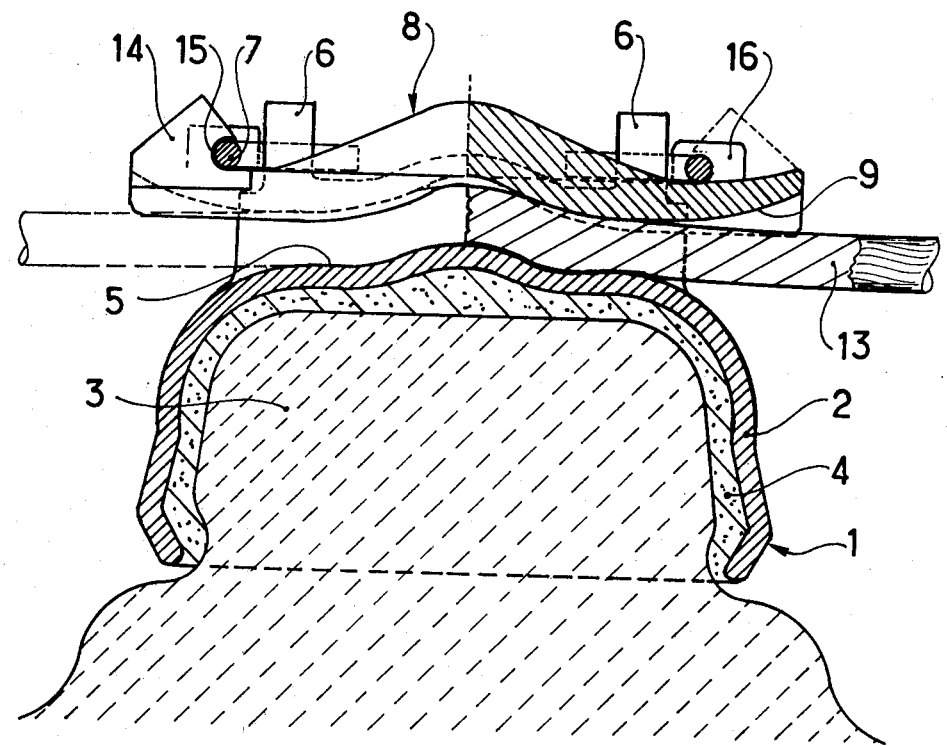
FIG. 3 illustrates the cross-section through III-III in FIG. 2, showing a half cut-away view of a moving shoe.

FIG. 4 illustrates on a larger scale a portion of the cross-section in FIG. 3; and FIGS. 5a, 5b, 5c and 5d are respectively cross-sections through 5a—5a, 5b—5b, 5c—5c and 5d—5d of FIG. 4, illustrating various steps in the progressive deformation of the fixed cable.

It must be understood that the embodiment of the device in accordance with the invention is described only by way of an example. The fundamental component, i.e. a groove which forms a cradle with an associated shoe, here supported by a hood fixed on the head of a support insulator, may be supported by any other appropriate support chosen by the man in the art in accordance with the particular use and/or the type of insulator concerned. Naturally, the invention covers the variants made simply by changing the support if the latter includes said fundamental component. In particular, the man in the art could easily apply the technology of the invention to fixing a cable under a suspension insulator at the lower part of the insulator chain.

Figure 1:
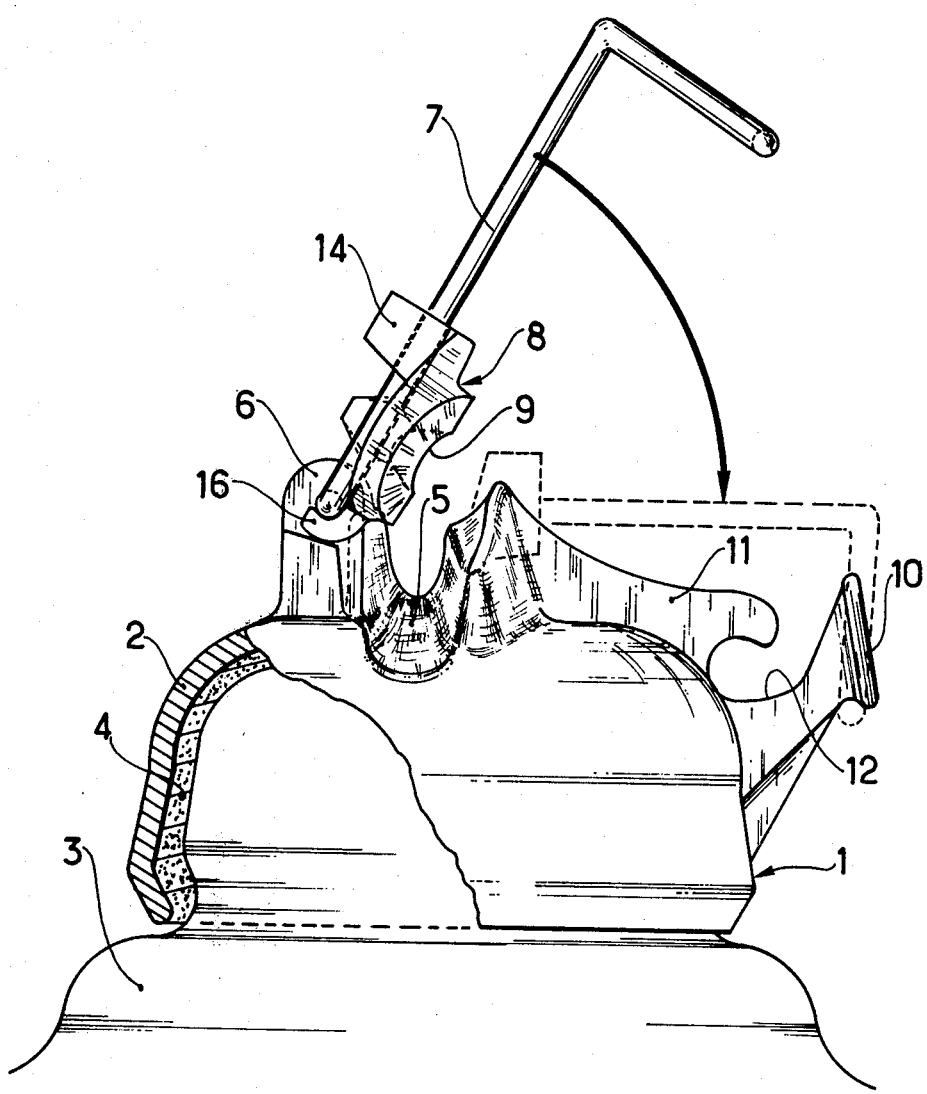
FIG. 1 is a partially cutaway elevation of a device in accordance with the invention, having a fixed part in the form of a one-piece hood fixed on the head of a support insulator.

FIG. 1 illustrates a fixed one-piece part 1 which is generally produced by molding. It forms a hood 2 fixed to the head 3 of a support insulator by means of asbestos cement 4. At the upper part of the hood, the fixed part 1 has a groove 5 which forms a cradle in which the cable to be fixed is laid and, in the vicinity of the groove, the hood also has two lugs 6 (only one of which is illustrated here) in which the end points of a resilient arm 7 are inserted. The arm 7 bears a shoe 8 whose main function is to clamp the cable against the bottom of the cradle with its bearing surface 9 in the locked position (shown in dashed lines). Said arm 7 can be snap-fitted onto a protruding part 10 of the hood to lock the assembly. The hood can also be surmounted by a thin projection 11 whose free upper edge acts as a bearing edge and guide edge for the cable which is in the waiting position against an edge 12 of the protruding part 10 when the cable is to be installed on its cradle.

The groove 5 which forms the cradle and the bearing surface 9 of the associated shoe will be discussed again in detail further on, since the fundamental feature of the invention resides therein.

Figure 2:
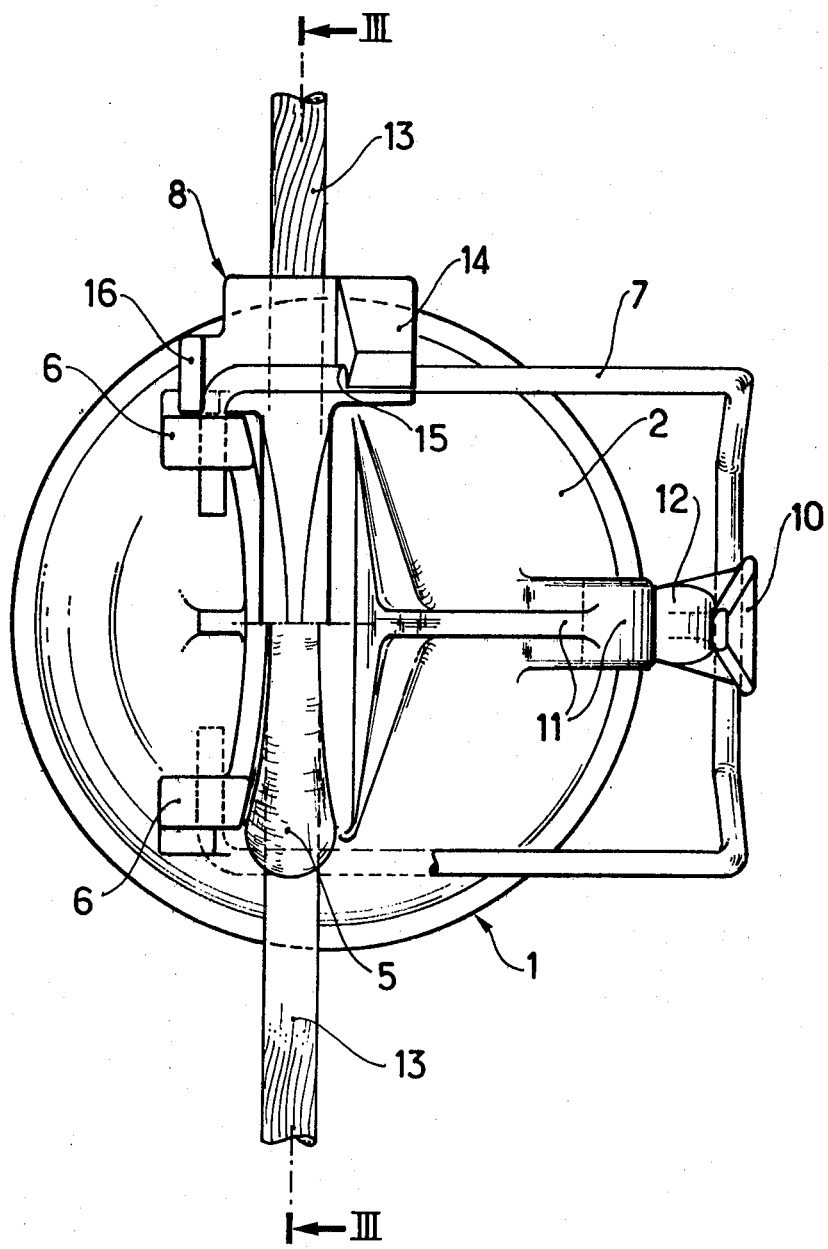
FIG. 2 is a plan of the device illustrated in FIG. 1 in its locked position, only a portion of the moving part being illustrated therein.

FIGS. 2 and 3 illustrate the cable 13 installed on its fixing device which is shown in the locked position. In these figures, the means for holding the shoe 8 are more clearly apparent: indeed, the shoe has two protruding parts 14 (only one of which is shown here) which define rounded bearing edges 15 against which the portion in question of the arm 7 is applied by its own resiliency and two rear stops 16 against which the folded back ends of the arm 7 press, said stops being externally adjacent to the lugs 6 in which the end points of said arm are fitted. As is well-known in the prior art, the center of the cradle may have a curved bottom line (see FIG. 3); it should be noted that simply curving the cable locally would not satisfactorily solve the problem of obtaining a differential tension which is substantially independent from the mechanical tension on either side of the fixing device. However, such a curve, provided with the characteristic groove of the invention, proves more efficient than if the bottom line of the cradle were rectilinear. Naturally, the shape of the bearing surface 9 of the moving shoe 8 is then compatible with the central curve of the cradle bottom.

In accordance with the invention, the fixed part and the moving part have surfaces of contact with the cable to be fixed such that said cable is subjected in the locked position to progressive deformation of its cross-section in a first direction substantially perpendicular to the direction which corresponds to the clamping of the moving part at the central portion of the cradle and in a second direction substantially perpendicular to the first direction at the two ends of the cradle.

Therefore, instead of crushing the cable in a single direction which corresponds to the clamping of the shoe (this being the case in devices of the prior art) the cable is deformed in two directions substantially perpendicular to each other and deformation is progressive and is produced by a single clamping movement. Therefore, there is obtained what may be called double progressive clamping.

FIGS. 4 and 5a to 5d show better how the device in accordance with the invention allows the cable to be deformed in a very particular progressive way in the locked position.

Indeed, the groove 5 of the fixed part 1 has a cross-section which changes progressively along the bottom line of the cradle, said line passing through a maximum at 17 and through two points of inflection 18 and 19 on either side of said maximum: the cross-section changes from a cross-section which is substantially semi-elliptical in shape, with its large axis perpendicular to the clamping direction of the moving shoe at each end of the cradle (at the point 19, cross-section 5b—5b which gives FIG. 5b) to a cross-section which is semi-elliptical in shape, parallel to said clamping direction at the central portion of said cradle (at the point 17, cross-section 5d—5d giving FIG. 5d), passing through a substantially semicircular intermediate cross-section (at the point 18, cross-section 5c—5c giving FIG. 5c). It is advantageous further to provide a cradle end cross-section which avoids damaging the cable in the case of a small bend in the latter: for this purpose, the end forms a flared tube whose cross-section changes from a semicircular shape at the point of contact between the cable and the surfaces 5 and 9 (at the point 20, cross-section 5a—5a giving FIG. 5a) to the semi-elliptical shape of the cradle at the point 19 (cross-section 5b—5b).

The bearing surface 9 of the shoe has a substantially constant elliptically shaped general cross-section which corresponds to the cross-section of the cradle at the first point of inflection 19, since it is not necessary here to provide a continuous bearing surface in contact with the cable along the whole length of the cradle: indeed, it is necessary only to provide two contact zones substantially situated at the two ends of the cradle (the clamping forces being schematically shown by the arrow 21 for the visible zone) since the tension of the cable and its own weight are sufficient to press it against the bottom of the groove at the central portion of the cradle and to clamp the cable in said portion.

It is self-evident that the radii of curvature of the cradle and the bearing surface of the moving shoe are not random radii of curvature, so that the device in accordance with the invention is efficient, all the more so as the device must be able to accept cables with various cross-sections, e.g. 7.5 mm and 9.45 mm in diameter. These radii of curvature must therefore be larger at the ends of the cradle than the radii of the cables, so that the cable to be fixed is properly flattened at the bottom of the cradle in the clamping portions: indeed, without such deformation, since the cable is generally greased, it is not possible to obtain sufficient differential slide tension. Further, in the central portion of the cradle, the radius of curvature at the bottom of the cradle must be less than the smallest radius of cable which can be accommodated by the device, said radius of curvature further being sufficiently large for the rate of deformation of the largest bare cable which can be accommodated not to exceed 12%. Thus, the cable is jammed in the upper central portion of the cradle by its own weight and by the effect of the moving shoe in the neighboring clamping portions; if the tension of the cable increases, under the effect of frost, for example, the cable is jammed more tightly in the upper portion of the cradle and further, since it is tautened, the cable tends to lift the bearing shoe in opposition to the resilient pull on the latter provided by the arm. This increases the pressure in the clamping portions and consequently increases the jamming of the cable in the upper portion of the cradle.

Therefore, by deforming the cable progressively along the whole length of the cradle, the device in accordance with the invention allows less local deformation of the cable for a same limiting differential traction. Such a device is particularly advantageous for replacing conventional fixing on a medium-tension insulator by binding. Lastly, it should be noted that the present device has improved resistance to vibration over devices of the prior art.

It is self-evident that the present invention is not limited to the examples which have been given thereof by way of illustration, but includes all variants which resume the general definition of the invention such as claimed, using equivalent means. In paticular, besides the easy transposition by another "support" to other types of insulators, the moving shoe may be a one-piece shoe or may be formed by two independent shoes and the component which links the shoe to the fixed part which allows the shoe to be applied by resilient pull forces can just as well be a steel pin which forms a spring, as a torsion bar or any equivalent means.

I claim:

1. An insulator equipped with a device for fixing a bare cable thereto, said device comprising a fixed part integral with the insulator and a moving part connected to the fixed part, said fixed part having a groove which forms a cradle adapted to hold a cable and said moving part adapted to clamp a cable in a locked position in said cradle, wherein the fixed part and the moving part have contact surfaces such that a cable in contact therewith in the locked position is subjected to progressive deformation of its cross-section in a first direction substantially perpendicular to the direction which corresponds to the clamping of the moving part at the central portion of the cradle and in a second direction substantially perpendicular to the first direction at the two ends of the cradle.

2. An insulator according to claim 1, wherein the cradle has a cross-section which changes progressively along the bottom line of said cradle, from a cross-section which is substantially elliptically shaped with a large axis perpendicular to the clamping direction of the moving part at each input of the cradle to a cross-section which is semi-elliptically shaped with a large axis parallel to said clamping direction at the central portion of said cradle.

3. An insulator according to claim 2, wherein, at each input, the cradle has a cross-section which changes progressively from the semi-elliptical shape to a substantially semi-circular shape for a portion of a cable which is not yet subjected to direct contact with the moving part.

4. An insulator according to any one of claims 2 and 3, wherein the bottom line of the cradle forms a curve at the central portion of said cradle.

5. An insulator according to claim 4, wherein the radius of curvature at the bottom of the cradle, in the central portion of said cradle, is smaller than the smallest radius of a bare cable which can be accommodated by said device, said radius of curvature also being sufficiently large for the rate of deformation of the largest bare cable which can be accommodated not to exceed 12%.

6. An insulator according to claim 3, wherein the moving part has only two contact surfaces substantially situated at the two inputs of the cradle.

7. An insulator according to claim 2, wherein the moving part is connected to the fixed part by an articulation component which allows the moving part to be applied on a cable by resilient traction forces.

8. An insulator according to claim 7, wherein the insulator comprises a body and a head attached to the upper part of said body, the fixed part is a one-piece hood fixed to the head of the insulator, the moving part is a shoe and the articulation component is a resilient arm which locks the moving part.

9. An insulator according to claim 8, wherein the groove which forms the cradle is in the upper portion of the hood so that a cable to be fixed is above said hood.

10. An insulator according to claim 9, wherein the groove is in the vicinity of the axis of the head of the insulator.

11. An insulator according to claim 2, wherein the insulator comprises a body and a head attached to the upper part of said body and wherein the device forms a plane of symmetry substantially perpendicular to the direction of a cable to be held therein and containing the axis of the head of the insulator.

* * * * *